(12) United States Patent
Fink

(10) Patent No.: US 9,592,899 B2
(45) Date of Patent: Mar. 14, 2017

(54) ROTARY WING AIRCRAFT WITH A MULTIPLE BEAM TAIL

(71) Applicant: AIRBUS HELICOPTERS DEUTSCHLAND GMBH, Donauworth (DE)

(72) Inventor: Axel Fink, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 219 days.

(21) Appl. No.: 14/679,072

(22) Filed: Apr. 6, 2015

(65) Prior Publication Data
US 2016/0272296 A1    Sep. 22, 2016

(30) Foreign Application Priority Data

Apr. 15, 2014  (EP) .................................... 14400026

(51) Int. Cl.
*B64C 1/26* (2006.01)
*B64C 1/06* (2006.01)
*B64C 27/82* (2006.01)

(52) U.S. Cl.
CPC ................ *B64C 1/063* (2013.01); *B64C 1/26* (2013.01); *B64C 27/82* (2013.01); *B64C 2027/8209* (2013.01); *B64C 2027/8254* (2013.01); *B64C 2027/8263* (2013.01)

(58) Field of Classification Search
CPC  B64C 1/26; B64C 1/061; B64C 27/82; B64C 39/04
See application file for complete search history.

(56) References Cited

U.S. PATENT DOCUMENTS

| 2,973,923 | A |   | 3/1961  | Sznycer |             |
|-----------|---|---|---------|---------|-------------|
| 3,116,896 | A | * | 1/1964  | Sigler  | B60F 5/02   |
|           |   |   |         |         | 244/17.11   |
| 3,153,521 | A | * | 10/1964 | Laufer  | B64C 1/00   |
|           |   |   |         |         | 244/120     |

(Continued)

FOREIGN PATENT DOCUMENTS

| CA | 2316418    | 2/2001 |
| DE | 102006004798 | 8/2007 |

(Continued)

OTHER PUBLICATIONS

Extended European Search Report for EP 14400026.2, Completed by the European Patent Office, Dated Oct. 21, 2014, 6 Pages.

*Primary Examiner* — Christopher P Ellis
*Assistant Examiner* — Michael Wang
(74) *Attorney, Agent, or Firm* — Brooks Kushman P.C.

(57) ABSTRACT

A rotary wing aircraft comprising a fuselage, a cabin volume enclosed by the fuselage, a main rotor arranged above the fuselage, a tail rotor mounted on a tail, the tail being attached to a rear part of the fuselage supporting the tail at its rear end, whereas the tail includes two beam boom elements, one element extending at the port side and the other element extending at the starboard side of the rotary wing aircraft, the front root end of each element being hinged to the corresponding lateral side of the fuselage, and both elements being canted with respect to the longitudinal axis of the rotary wing aircraft so as to be interconnected to each other at the rear portion of the tail.

14 Claims, 8 Drawing Sheets

(56) References Cited

U.S. PATENT DOCUMENTS

| | | | | |
|---|---|---|---|---|
| 3,921,938 A | * | 11/1975 | Jupe | B64C 27/50 |
| | | | | 244/17.11 |
| 4,245,801 A | * | 1/1981 | Mulvey | B64C 1/063 |
| | | | | 244/120 |
| 4,293,109 A | * | 10/1981 | Bramwell | B64C 1/063 |
| | | | | 244/17.11 |
| 6,050,521 A | | 4/2000 | Regonini | |
| 6,729,576 B2 | | 5/2004 | Kay et al. | |
| 2004/0031879 A1 | | 2/2004 | Kay et al. | |
| 2009/0277991 A1 | | 11/2009 | Mikulla | |
| 2012/0280079 A1 | | 11/2012 | Brand et al. | |
| 2014/0291440 A1 | * | 10/2014 | Stekelenburg | B64C 27/02 |
| | | | | 244/2 |

FOREIGN PATENT DOCUMENTS

| | | |
|---|---|---|
| DE | 202010014056 | 12/2010 |
| DE | 202012002493 | 6/2012 |
| DE | 102011010097 | 8/2012 |
| EP | 2690010 | 1/2014 |
| GB | 2320477 | 6/1998 |
| GB | 2359533 | 8/2001 |
| GB | 2449743 | 12/2008 |
| RU | 2246426 | 2/2005 |

\* cited by examiner

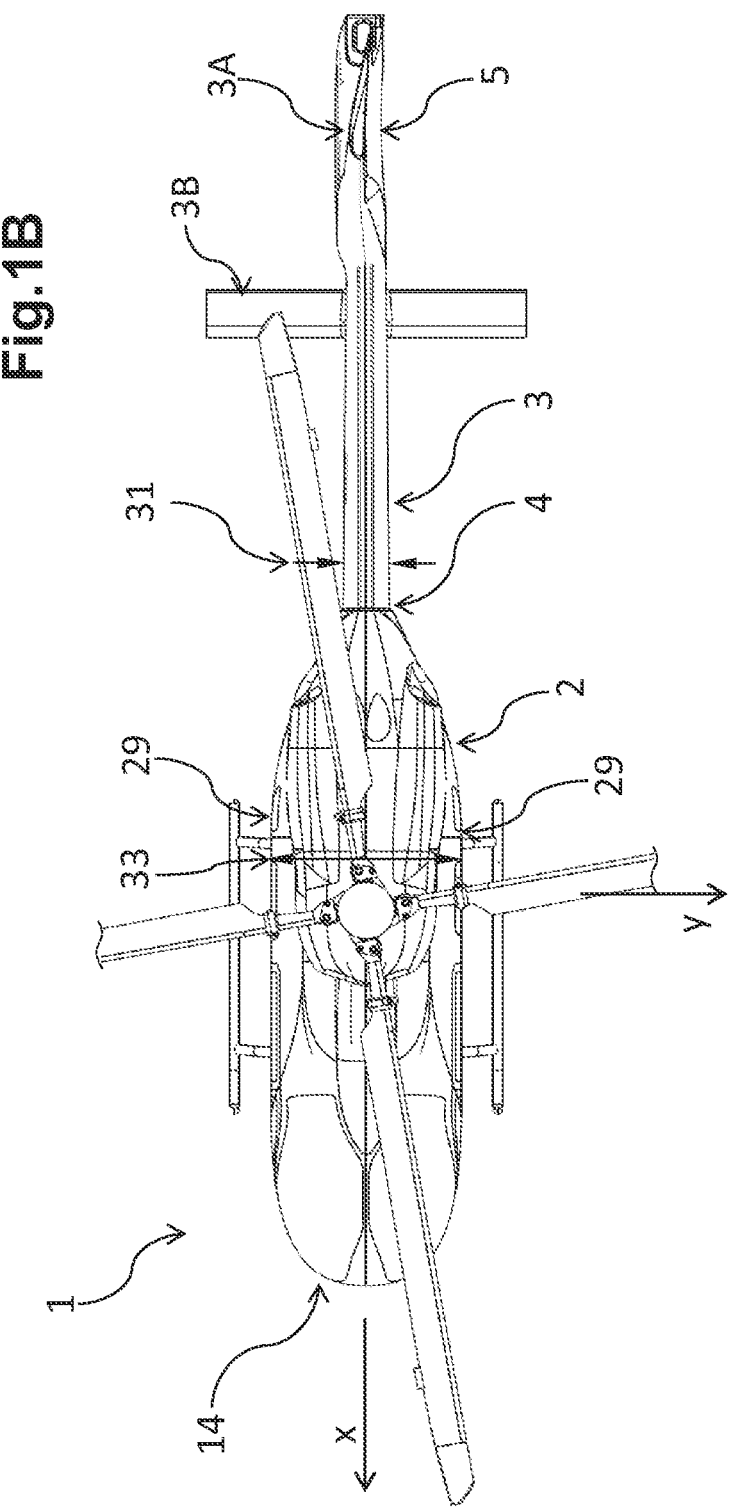

ROTARY WING AIRCRAFT WITH A MULTIPLE BEAM TAIL

CROSS REFERENCE TO RELATED APPLICATION

This application claims priority to European patent application No. EP 14 400026.2 filed on Apr. 15, 2014, the disclosure of which is incorporated in its entirety by reference herein.

BACKGROUND OF THE INVENTION (1) Field of the Invention

The invention relates to a rotary wing aircraft with a tail supporting a tail rotor, possibly at least one tail rotor being an electrically driven tail rotor.

(2) Description of Related Art

The dominant rotary wing aircraft configuration in the present time is based on helicopter basic design including a single main rotor and an auxiliary tail rotor to counter torque and provide directional yaw control. The tail rotor is mounted at the rear end of a supporting structure—the tail boom—behind the main fuselage. This tail boom is typically a single beam element.

A fin arranged at the same location as the tail rotor provides for directional stability during forward flight hence relieving the tail rotor and reducing the power needed for anti-torque. One or more horizontal tail planes are arranged as well at the aft portion of the tail boom or on top of the fin in order to provide for pitch stability. The large lever arm between the center of gravity and the tail rotor improves the efficiency of the active and passive stabilizing system and reduces the interaction with the main rotor.

Conventional tail boom constructions of helicopters are typically provided with a slim cross-section which allows for sufficient clearance for rear loading and for avoiding collisions with the blades of the main rotor. Slim cross-sections of a tail boom beam element lead to reduced bending and torsional stiffness and high root stresses at the mounting of the tail boom beam element to a fuselage of the helicopter, the bending stiffness being a potential concern in terms of the dynamic behavior of the helicopter and the root stresses being mainly a serious source of strength and fatigue issues.

Moreover, the root attachment of a centrally arranged tail boom is allocated on an upper part of the fuselage, which leads, on the one hand, to a reduction of cabin volume and loading clearance. On the other hand the root attachment sets important requirements on the front root structure of the tail boom in terms of fire resistance due to its integration within the engine deck area of the helicopter, leading to a higher structural complexity and the use of expensive materials and complex interface joints. Typical tail booms are impacted by the hot exhaust gases of the helicopter's engines, especially during hover, setting important requirements to the choice of structural materials in terms of their heat resistance which translates to less design flexibility and larger material costs.

The disassembly of a typical continuous circumferential joint of a single tail boom beam element with a large amount of fasteners from a fuselage or the integration of pivotable features between a single tail boom beam element and a fuselage is complex. The integration of pivotable features within conventional tail booms is inefficient since it does not allow large folding angles relative to a fuselage due to the central arrangement of the tail booms with cross-sections widths considerably smaller than the width of the fuselage.

Integrated tail booms shaped as a smooth continuation of the fuselage hull lead to reductions in drag during forward flight but, on contrary, to an increase of down-load in the hover.

A streamlined tail boom may be practical on executive transports, but for other purposes rear loading ramps or clamshell doors may be needed which result in typical pod and boom designs with higher drag during forward flight. The integration of pivotable or dismountable streamlined tail booms lead moreover to a considerable structural weight increase and to less efficient folding characteristics.

A typical cylindrical shape of a tail boom is optimal for torsional stiffness but it is generally less efficient when subjected to a transverse flow. The unstable characteristics of a transverse airflow across a cylindrical shape are a possible source of shaking in the hover of the helicopter, which is a phenomenon directly linked to the bending stiffness of the tail boom.

The tail boom houses the transmission and controls of the tail rotor, antennae and other systems, i.e. on-board equipment (e.g. electric, mechanical, electronic, tactical, etc.). Transmission shafts are typically arranged outside and on top of the load carrying tail boom structure to allow for easy inspection and maintenance.

A wide variety of different approaches have been suggested in order to support or even fully replace the anti-torque duty of the tail rotor or just to reduce its noise generation, some of them using the down-wash airflow generated by the main rotor in order to passively generate an additional lift force to counter-torque. A tail boom structure has to be designed according to static, dynamic and fatigue requirements, hence showing a certain bending and torsional stiffness, an adequate strength and an appropriate mass.

Two types of tail boom are present, which differ from each other in the way of structural integration within the main fuselage body. The first typical tail boom is a single, slim beam element which is attached on its front end to the fuselage aft and top region. The typical cross-section of those tail booms is essentially cylindrical with a flat top or bottom base. The second type of tail boom is one single boom integrated within the fuselage body with a smoothly tapered transition from the central fuselage body to the tail. The cross section is however larger than that of the first design hence leading to increased down-loads generated by the down-wash of the main rotor.

Besides, twin boom configurations are seldom and have been especially suggested for high speed rotorcraft configurations, the twin booms being typically parallel and attached at their rear end to the tips of a transverse tail plane.

Some rotary wing aircrafts are designed with foldable capabilities so as to reduce their overall dimensions to facilitate stowage in confined available spaces. Typical folding capabilities are limited to the folding of the blades rearwardly and the folding of a rear portion of the tail forwardly.

Most rotary wing aircrafts in use carry tail rotors that are mechanically driven from the main turboshaft powerplant through a complex system of shafts, transmissions, and couplings. The configuration requires a direct mechanical power transmission from the powerplant to the tail rotor (deflections require heavy gear boxes) intensive maintenance and continuous inspection.

Illustrating the above, the following documents have been considered in the application, i.e.: GB2359533, GB2449743, U.S. Pat. Nos. 2,973,923, 6,050,521, 3,921,938, US2004/0031879, US2012/0280079, CA2316418, DE102011010097, DE202010014056, DE202012002493, DE102006004798, EP2690010, GB2320477, RU2246426 and US2009/0277991.

The document GB2359533 discloses a dismountable helicopter with a modular airframe and rotor unit. The torque compensating rotor in the tail of the helicopter is driven by a thin-walled drive shaft, detachably connected to the main power drive.

The document GB2449743 describes an aircraft which can be dismounted into different parts; inter alia its rear part is entirely separable from the front part of the aircraft.

The document U.S. Pat. No. 6,050,521 discloses a releasable coupling for a power transmission to a tail rotor of a foldable-tail-section helicopter. The coupling consists of two coupling assemblies, one associated with the front section of the helicopter, the other one associated with the tail section of the helicopter. The two coupling assemblies are coupled via radial toothings, cooperating telescopically with each other.

The document U.S. Pat. No. 3,921,938 A shows a typical cantilever tail boom but with an asymmetrical arrangement with respect to the aircraft's longitudinal axis. The tail boom is pivotable about its front attachment to the fuselage. This arrangement allows for folding capabilities and a minimum stowage volume.

The document U.S. Pat. No. 6,729,576 shows a special structural design for a typical cantilever tail boom arrangement using composite materials.

The document US2012/00280079 shows a special design of a typical cantilevered tail boom with a streamlined cross-section of the tail boom in order to generate an anti-torque force by the effect of the downwash from the rotor.

The document U.S. Pat. No. 2,973,923 describes a helicopter construction having a cabin and a main body that includes cabin framework as well as a tail for a counter torque rotor. The main body is formed of welded tubular metallic members, suitably cross braced. The main body is box shaped in cross-section, having no appreciable depth throughout. The main body has supports that carry a pair of motors for pivoting four rotor blades.

The document EP2690010 describes a compound helicopter with a pair of tail booms and a pair of fixed main wings and a pair of additional propulsive devices, for lift and thrust during forward cruise flight.

The document DE102011010097 describes a remote controlled model helicopter. Two receiver items are releasably connected to side plates of a helicopter frame. The helicopter frame is manufactured as an injection molded component. A tail boom mount is disposed at the level of a tail pulley so that a rear strap may be passed through a tail boom for a tail rotor. Under the tail boom, two struts support the tail boom and are attached to the helicopter frame.

The document DE202010014056 describes a radio controlled model helicopter. A rear fairing has side plates extending from the body to the tail of the model helicopter. The rear fairing has an open design for airflow through the cell and the tail boom in the direction of the rotor axis. The rear fairing has an integrated side plates fin. The rear fairing has for support of a stern tube, located fixings that give the side panels lift and shape. The rear fairing has a fastening on a chassis of the model helicopter to produce a self-supporting structure.

BRIEF SUMMARY OF THE INVENTION

It is an objective of the invention to provide a rotary wing aircraft with an alternative tail boom configuration allowing for reductions of structural complexity and manufacturing costs while improving robustness and improving functional and operational capabilities.

The solution is provided with a rotary wing aircraft with the features of claim 1 of the invention. Preferred embodiments of the invention are provided with the subclaims.

According to the invention a rotary wing aircraft is provided with a longitudinal axis in x-direction and comprises a fuselage forwardly oriented relative to the longitudinal axis with a port side and a starboard side as lateral sides. A main rotor is arranged above the fuselage and an anti-torque rotor is mounted on a tail. A tail boom is attached to a rearward oriented part of the fuselage.

Said tail boom supports with its rear end said tail. At least one engine is provided for driving said rotors. Said at least one engine is mounted to an engine deck on top of said fuselage. The tail boom is provided with at least two beam boom elements. At least one of the two beam boom elements extends from the port side and at least another one of the two beam boom elements extends from the starboard side of the fuselage to said rear end.

A front tail boom beam element root of each of the at least two beam boom elements is respectively attached to the corresponding lateral side of the fuselage and each of the at least two beam boom elements are canted with respect to the longitudinal axis and interconnected to each other at the rear end of said tail boom.

According to an embodiment of the invention front attachments of the respective tail boom beam element roots of each of the at least two beam boom elements at the fuselage are simply supported hinged connections.

According to a further embodiment of the invention the cross-section of each of the at least two beam boom elements has a height-to-width ratio of at least three.

According to a further embodiment of the invention the tail boom is pivotable about the front attachment of one of the at least two beam boom elements.

According to a further embodiment of the invention the front attachment of each of the at least two beam boom elements has four or less but preferably not less than two securing bolts. Other way speaking, the number of securing bolts for each of the beam boom elements is chosen among: two, three, four.

According to a further embodiment of the invention at least one front attachment of one of the at least two beam boom elements is releasable.

According to a further embodiment of the invention one of the at least two beam boom elements is interconnected to another one of the at least two beam boom elements at its rear end by means of a simply supported hinged connection. For instance, the hinged rear connection has four or less but preferably not less than two bolts.

According to a further embodiment of the invention one of the at least two beam boom elements is pivotable with respect to another one of the at least two beam boom elements about the rear hinged connection.

According to a further embodiment the cross-section of each of the at least two beam boom elements has an airfoil shape so as to produce an anti-torque lifting force as a result from the down-wash flow.

According to the embodiment, a gap is transversally provided between the two tail boom beam elements and this air gap has a transverse dimension that is comprised between an upright height dimension in cross section of the tail boom beam elements and five times this upright height dimension at the root of the tail boom beam elements.

According to a further embodiment outer shapes of the at least two beam boom elements are an aerodynamic continuation of the hull of the fuselage.

According to a further embodiment the tail boom comprise at least an electrically powered rotor drive. Particularly, electrically powered tail rotor drives are provided. The introduction of electrically powered rotor drives opens new design possibilities of the tail boom due to the lack of mechanical force dynamic transmission shafts. The replacement of tail rotor shafts and gearboxes with electrical power transfer and rotor drives is deemed a possible future option in order to improve performance, reliability, safety and maintainability for rotary wing aircrafts, e.g. of the light tonnage category.

The invention allows the following embodiments:

The suggested tail boom design is preferably composed of two boom beam elements. The front end of both elements is attached to the upper lateral portion of the rear fuselage, and the elements are attached to each other at their rear portion close to the tail. Hence, the tail boom architecture represents a triangular framework of two truss elements (the tail boom elements) in an essentially x-y plane.

The tail boom beam elements, or—to be more precise—the neutral axis of the tail boom beam elements are straight. The tail boom beam elements have a cross section (in the y-z plane) which has a height which is considerably larger than its width. The area masking, i.e. the maximal cross-section area in the x-y plane of the tail boom beam elements of the truss construction is considerably less than the masking of a single cantilever tail boom of the prior art.

The width of the cross section of the tail boom beam elements at their front end is one to 5 times less than the distance between both beam boom elements. Hence, a gap between both beam boom elements extends between them. The cross section of the tail boom beam elements of the truss construction can be tapered towards the rear end of the tail boom beam elements.

The cross section of the tail boom element in the y-z plane can be shaped to an airfoil contour in order to provide for an additional lift force supporting the tail rotor to counteract the torque and reduce the down wash effects by lower drag coefficients.

The attachment of the tail boom elements to the fuselage is simply supported, which means, that no bending moments but longitudinal and transverse forces are transferred to the fuselage structure within the plane which is spanned by the neutral lines (the neutral line of an element results from the connection of all centroids of each cross section) of both tail boom beam elements (which essentially corresponds to the x-y plane of the aircraft). Since no bending moments have to be transferred in this plane by each beam boom elements, the cross section of the tail boom beam elements can be relatively thin in comparison to the height.

The tail boom beam elements have to transfer however bending moments in an essentially x-z plane, therefore the height of the cross section is considerably larger in comparison to the width. Hence, the tail boom beam elements act as longitudinal elements in the x-y plane, but as bending beams in the x-z plane. Hence, the attachment of the tail boom beam elements to the structure at their front root end is accomplished by means of a very small amount of bolts: at least only two for each tail boom beam element are necessary to transfer all loads. In an embodiment, the bolts connect two main spars of the tail boom element (one per each main spar) to a fuselage main frame and to two fuselage intercostals. More bolts can be however used in order to increase the fail safe characteristics of the tail boom attachment. However, the bolts have to be arranged coaxially in order to avoid bending moments and to allow for foldability.

The tail boom beam elements can be arranged to be foldable. The first tail boom beam element can be detached at its root connection to the fuselage and pivoted about its attachment to the second beam element (interconnection point of both boom beam elements); the whole truss construction is then pivoted about the connection of the second boom beam element to the fuselage.

The longitudinal lines of action, i.e. the centroidal axis of the load carrying cross-section of the truss elements, intersect each other at an intersection point allocated on the x-z plane. The transverse force generated by the tail rotor and tail plane coincides with said intersection point in order to avoid secondary bending and torsional loads on the tail boom beam elements. The interconnection point of both tail boom beam elements to each other not necessarily has to be coincident with the intersection point.

The tail boom beam elements show an upper part and/or a lower part (above and below the load carrying box). Embarked equipment's are e.g. installed within these compartments and access doors and covers can be provided within these parts.

The suggested architecture is suited for electrically driven tail rotors, since there is then no need for a mechanical transmission between the upper fuselage deck and the tail.

The invention provides the following advantages:

The suggested design represents a truss design in an essentially x-y plane and a beam design in an essentially x-z plane and not a full cantilever design of the state-of-the-art in both planes. That means, the structural stiffness is considerably larger in comparison to cantilever booms: in the x-y plane as a result of the truss design and in the x-z plane as a result of larger height-to-width ratios of the tail boom beam element cross sections. Cantilever booms are loaded by bending as a result of transverse loads (acting in y and z direction) at its rear end, i.e. corresponding to the tail rotor thrust force and the superposed aerodynamic lift force of the vertical tail in y-direction and horizontal tail aerodynamic loads in z-direction as well as inertia mass loads in both directions, whereas the truss design in an essentially x-y plane shows longitudinal loads at their truss elements, in case of the transverse load acting at the intersection point of their lines of action in y-direction in an essentially x-y plane.

Since the transverse y-load of the tail acts more or less in the same place, the secondary bending loads of the truss elements can be considered as negligible in comparison to the longitudinal loads of the truss elements. Transverse loads in z-direction excite bending loads at each tail boom beam element within an essentially x-z plane.

The tail boom beam elements are attached at the rear, lateral, top of the fuselage and not on top of the rear central part of the fuselage as it is the case for conventional cantilevered booms. That means, the base for the reaction of the bending loads excited by the transverse (in y-direction) fin loads at the tail boom beam element root is larger in comparison to conventional cantilever boom architectures. The base is now as large as the width of the rear part of the fuselage, whereas cantilever boom designs according to the state of the art show a boom root width which is a portion of the fuselage width only. The larger base for the reaction of the bending loads leads to considerably lower loads at the roots of the boom of the present invention and a higher structural stiffness.

Other boom architectures of the state-of-the-art show booms shaped as a smooth continuation of the fuselage hull. For those arrangements, the cross section of the boom at its root is as large as the fuselage and the root loads are low. However, a wide tail boom with a large cross-section close to the width of the fuselage suffers a considerably download during hovering. Besides, such booms are not perfectly efficient with respect to folding or disassembly requirements. The tail boom beam elements of the suggested invention have a considerably narrower width (three to ten times less than the fuselage width) in comparison to these tail boom designs.

The suggested design shows a cross section of the tail boom beam elements with a width which is considerably narrower than its height, leading to larger height-to-width ratios of 2 to 10. The height—which can be larger than the height of conventional pod and boom tail designs—is effective in reacting the bending loads excited by transverse loads in z-direction and providing for adequate bending stiffness in z-direction. A reduced width of the tail boom beam elements represents a lower masking for the down-wash from the main rotor, and a thin streamlined shape leads to reduced drag coefficients, both effects leading to reduced down-loads in hover in comparison to conventional tail booms.

The cross section of the tail boom beam elements can be airfoil-shaped in order to generate a supporting anti-torque force during hover.

The attachment of the tail boom beam elements is fairly simple, and can be accomplished by means of a small amount of bolts, i.e. with a minimum amount of two bolts for each boom beam element. This fact enhances the simplicity of the assembly process and allows for an easy disassembly, the whole tail being dismountable with a few operation steps only. Typical fatigue problems associated to the flanged joint at the tail boom beam element root can be minimized.

The tail boom beam elements can be designed as smooth continuation of the hull hence allowing for a lower drag in forward flight.

The truss structure is forwardly foldable, the folding process requiring the release of the root joint of one tail boom beam element and the pivoting of the entire tail boom structure about the root attachment of the other tail boom beam element whilst pivoting the released tail boom beam element about its interconnection point to the other tail boom beam element. Folding the tail boom and the rotor blades significantly reduces the folded dimensions of the inventive rotary wing aircraft.

The root attachment of the tail boom beam elements is distant from the engine deck and is hence not subjected to the associated fire risk. The entire tail boom can be manufactured and designed without consideration of fire proof requirements which translates to larger cost-effectiveness.

Since there is no tail boom attached to the rear fuselage center portion the suggested solution offers a large, undisturbed rear cabin compartment, which allows for the implementation of large rear access doors. This advantage allows for efficient cargo and rescue operations. The cabin compartment height is not limited by the tail boom as it is the case for configurations of the state of the art. The inventive design results in a more spacious cabin compartment.

The heat impact of the engine exhaust gases on the tail boom structure can be reduced with a suitable arrangement of the engine exhaust pipes.

The structural complexity of the engine upper deck can be considerably reduced which translates to improved cost-effectiveness and weight-effectiveness of the inventive rotary wing aircraft.

The design and manufacturing of the tail boom beam elements is simple allowing for a high structural integration. The systems integration i.e. embarking of on-board equipment is easy as well, being e.g. allocated within a top and/or lower region of the tail boom beam elements.

The cross section of the tail boom beam elements of the inventive rotary wing aircraft is not cylindrical. Cylindrical sections are not ideal for transverse flows since transverse airflows across a cylindrical shape are unstable and excite shaking during hover.

The suggested design is suited for electrically driven tail rotor configurations, since no direct connection between the gear box (allocated on the upper deck of the fuselage) and the tail rotor is required, whereas for conventional mechanically driven tail rotors the shaft connection between the gear box and the tail rotor is deemed complex and heavy, requiring some deflection gears.

The torsional weight efficiency of the tail boom beam elements might be less in comparison to a single tube. However, the torsion stiffness requirements shall be less relevant depending on the action point of the anti-torque force, the center of gravity of the tail mass and the arrangement of the tail boom beam elements.

BRIEF DESCRIPTION OF THE SEVERAL VIEWS OF THE DRAWINGS

Preferred embodiments of the invention are outlined by way of example with the following description with reference to the attached drawings.

FIGS. 1A and 1B respectively show a side and a top view of a rotary wing aircraft according to the state of the art.

DETAILED DESCRIPTION OF THE INVENTION

Figure 1A:
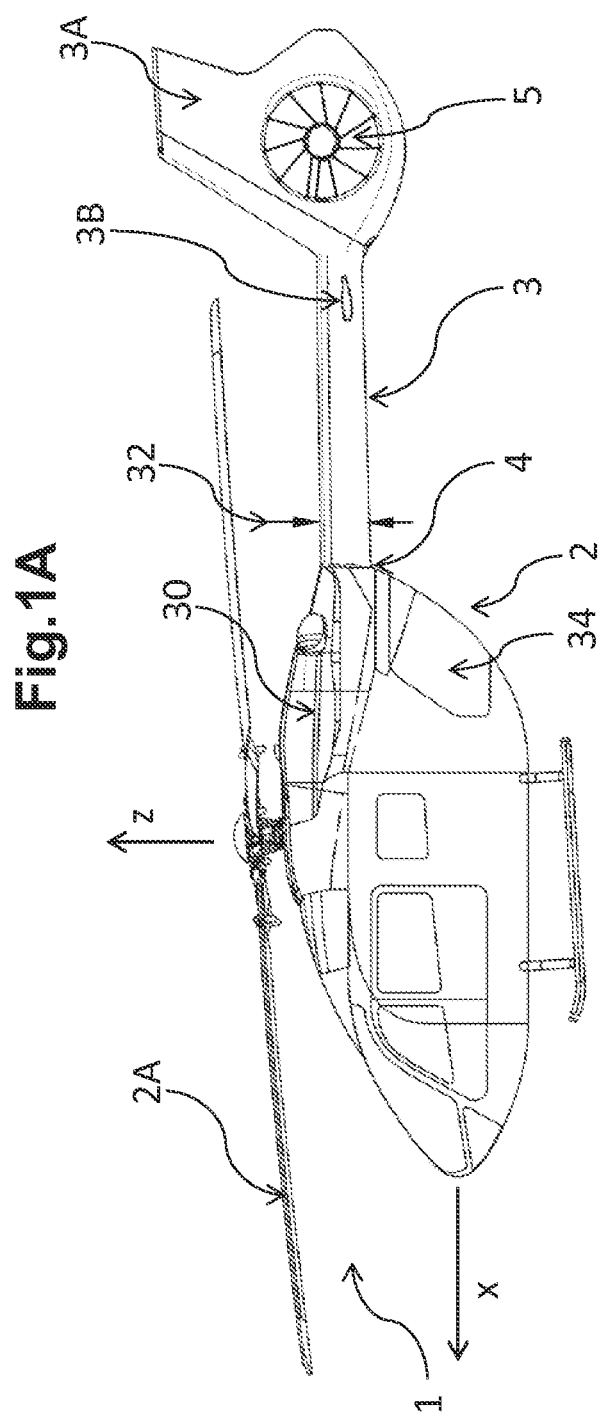
Figure 2:
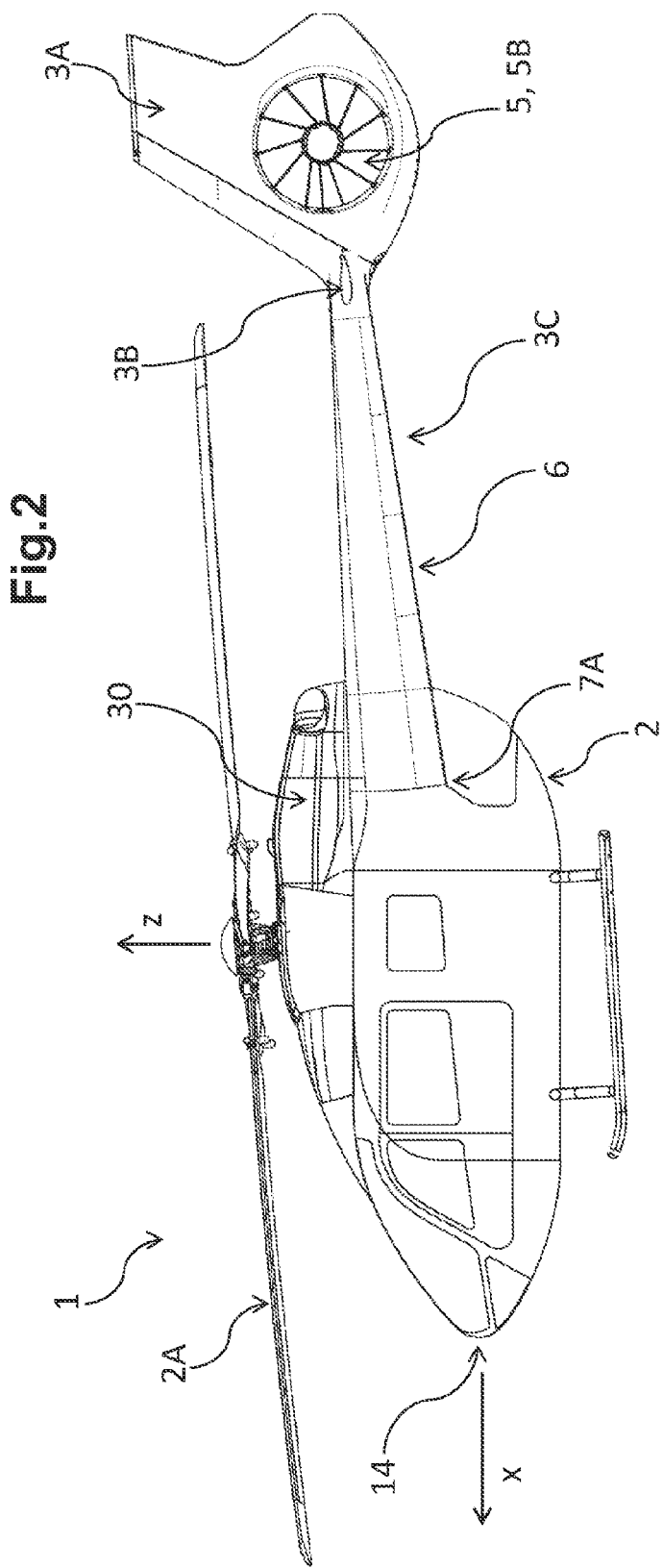
FIG. 2 shows a side view of a rotary wing aircraft according to the invention.
Figure 3:
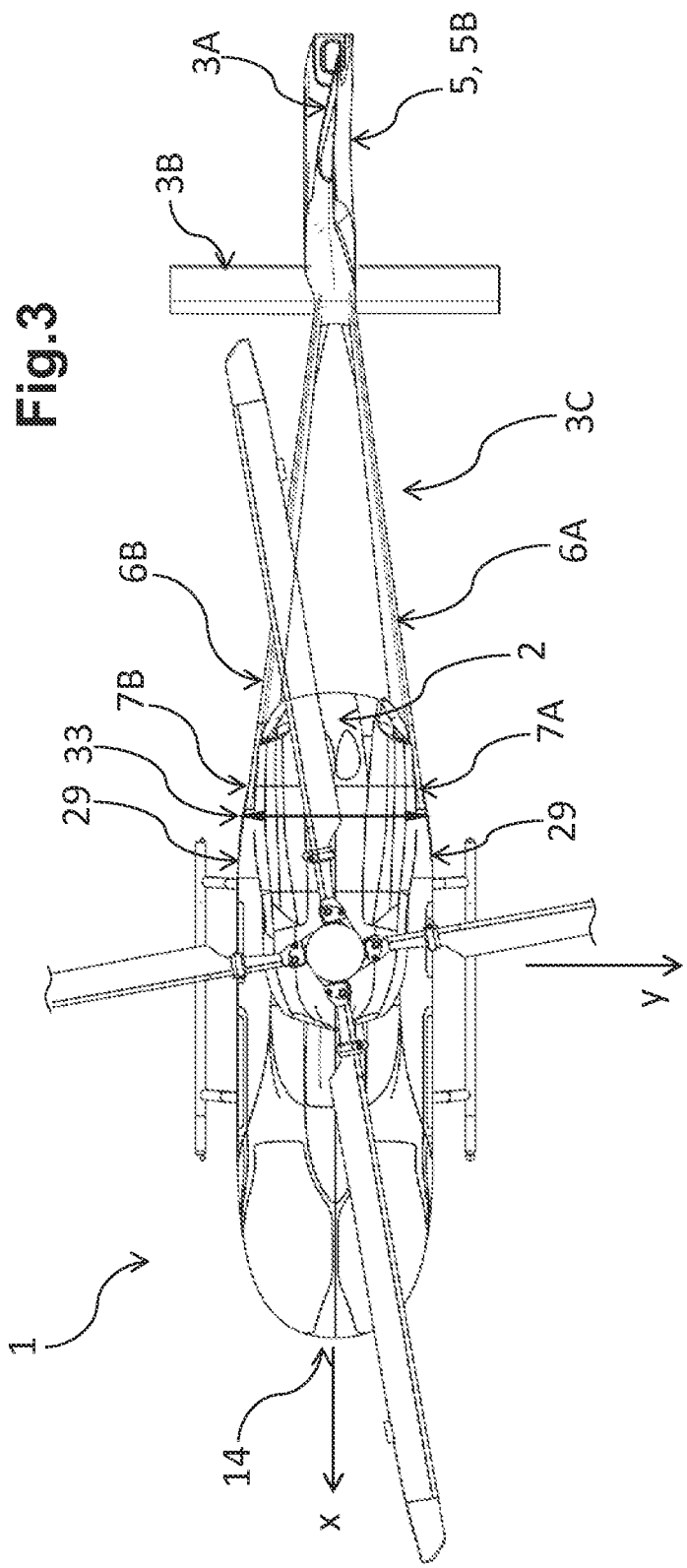
FIG. 3 shows a top view of the rotary wing aircraft according to the invention.

According to FIGS. 1A and 1B a known rotary wing aircraft 1 of the helicopter type comprises a fuselage 2 and a single central tail boom 3 in conventional cantilever configuration mounted to a rear part of said fuselage 2. A main rotor 2A is mounted to a top deck of the fuselage 2. The single central tail boom 3 comprises a fin 3A and one or a plurality of horizontal planes 3B, at the very aft end of the tail boom. The single central tail boom 3 has a height 32 and a width 31 and it is attached to the rear part of the fuselage 2 at a tail boom root 4. The rear part of said fuselage 2 is provided with a rear access door 34. The fin 3A is generally vertical, is attached to a rear end of the tail boom 3 and houses a tail rotor 5 (here of Fenestron © type). The width 31 of the tail boom 3 is considerably less than a fuselage width 33. Engines 30 for driving the rotors 2A, 5 are allocated in an engine deck of the rear part of said fuselage 2.

FIGS. 2-7 illustrate embodiments of the invention. In FIGS. 2-7 corresponding features are referred to with the same references than the ones of FIG. 1. A rotary wing aircraft 1 according to the invention is provided with a front part 14 in an x-direction (longitudinal direction X). Instead of the single central tail boom 3 of the art, an inventive tail 3C includes tail boom beam elements 6A, 6B that are attached respectively to the port side and starboard side of the fuselage 2, longitudinally ahead of the rear part of the fuselage 2 in x-direction at respective lateral tail boom beam element roots 7A, 7B below the engine deck and the engines 30. The tail boom beam elements 6A, 6B belongs to the multi beam tail 3C—having at least one fin 3A and one tail rotor 5—which makes the inventive tail 3C distinct from the prior art tail boom 3 of FIG. 1. In embodiments, the tail boom beam elements 6A, 6B are straight lined, i.e. the tail beam boom elements 6A, 6B extend in straight line until the transition from the fuselage 2 to the vertical fin tail 3A.

Figure 7:
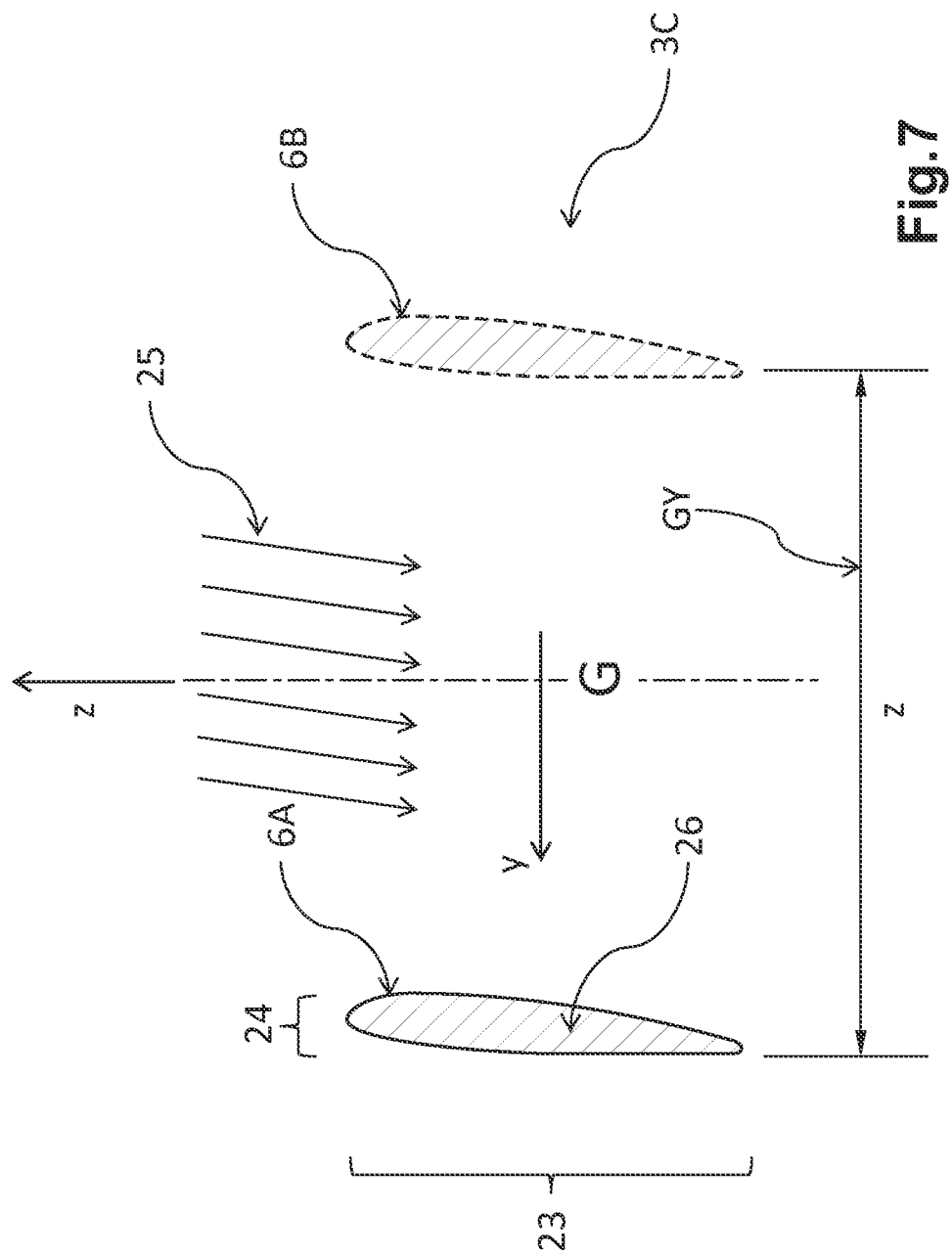
FIG. 7 shows a transverse upwards (y-z plane) cross sectional view of two tail boom elements of the rotary wing aircraft according to the invention.

The port side beam element 6A and the starboard side beam element 6B of the inventive tail 3C provide a framework-type construction for the support of tail 3C. The two beam elements 6A and 6B of FIGS. 7 are arranged separately in a y-direction to lateral sides 29 of the fuselage 2 of the rotary wing aircraft 1 with respect to the longitudinal x-direction fuselage at their respective tail boom beam element roots 7A and 7B.

The port side beam element 6A and the starboard side beam element 6B have a distance between each other at their respective tail boom beam element roots 7A and 7B corresponding to almost the entire width of the fuselage 2 in y-direction (transverse direction Y). The port side beam element 6A and the starboard side beam element 6B are arranged symmetrically to the longitudinal x-direction of the rotary wing aircraft 1, while the respective shapes of their cross sections in an x-z plane shall not necessarily be symmetrical to the x-direction. None of the tail boom beam elements 6A and 6B are directly attached to a center portion of the rear part of the fuselage 2, hence offering a large, undisturbed rear part area for large access doors to the fuselage 2.

The port side beam element 6A and the starboard side beam element 6B are designed as smooth continuation of the hull of the fuselage 2 and the tail boom roots 7A and 7B are away from, i.e. below, the engine deck at an upper part of the fuselage 2 and the engines 30. The port side beam element 6A and the starboard side beam element 6B are canted for interconnection to each other at their rear portion of the tail 3C towards the fin 3A. On FIG. 3, the rotor 5 shall be an electrically powered tail rotor 5B, thus making useless the mechanical force power transmission between the fuselage 2 and the tail rotor 5B.

Figure 4:
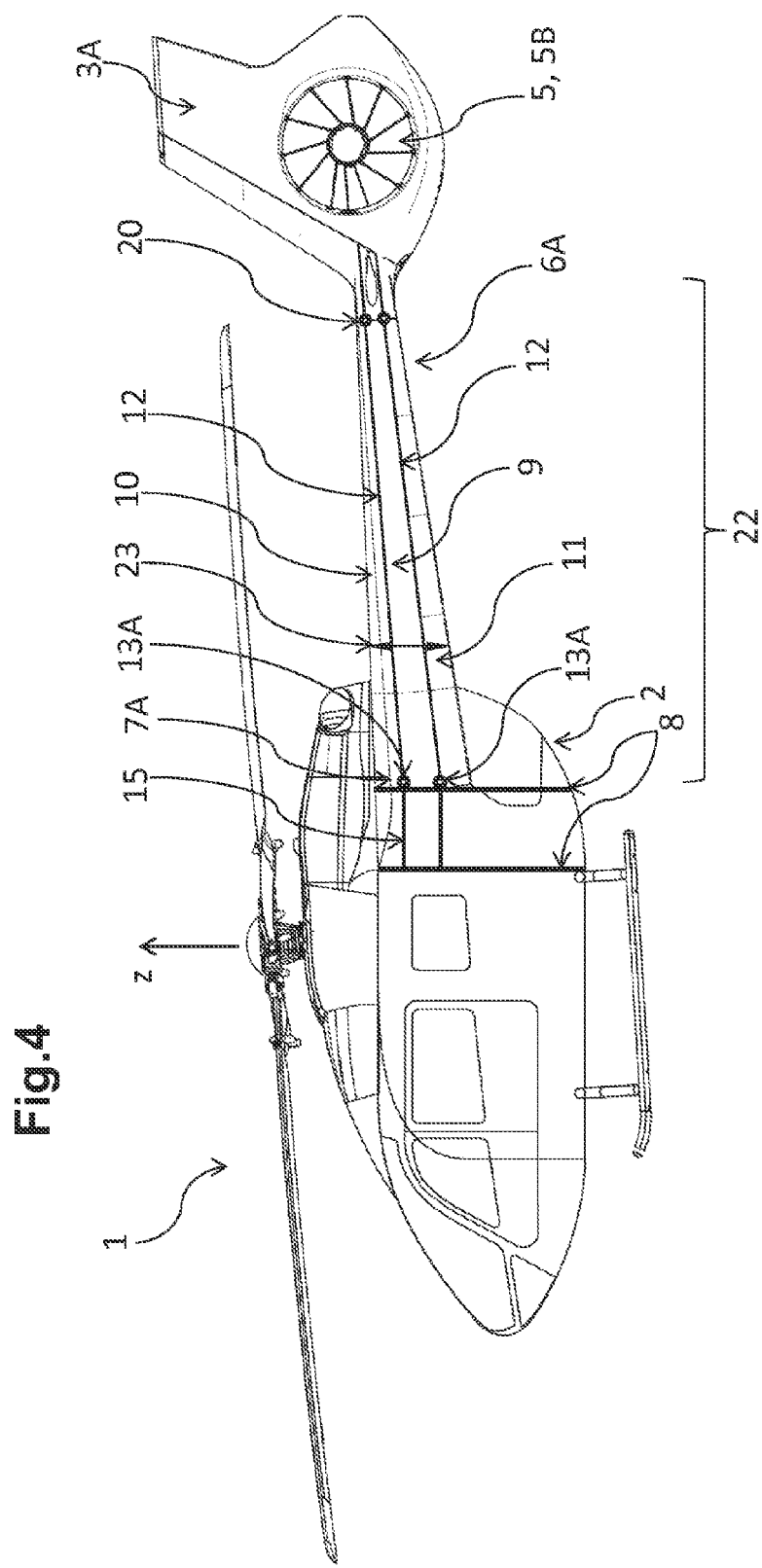
FIG. 4 shows a port side view of the rotary wing aircraft according to the invention with a schematic arrangement of the structural supporting elements.

According to FIG. 4 the port side boom beam element 6A and the starboard side beam element 6B of the rotary wing aircraft 1 feature a main load carrying box 9 confined between two main spars 12 and sheathed by a skin (not shown). On top of the main load carrying box 9 in z-direction is provided an upper compartment 10 and below in negative z-direction of the main load carrying box 9 there is a lower compartment 11 e.g. used for systems installation. The spars 12 of the port side boom beam element 6A are attached at the corresponding tail boom beam root 7A at two attachment points 13A separate in z-direction.

Here, the attachments simply supported hinged connections, meaning they alone do not transfer bending moments. Each attachment point 13A is a releasable single-bolt-joint. The attachment points 13A are connected to a rear frame 8 with two corresponding intercostals 15 supported by said frame 8 in the fuselage 2. At the rear end of the port side boom beam element 6A is a hinged connection 20 with a minimum of two bolts separate in z-direction.

The starboard side boom beam element 6B and its connection to the fuselage 2 are structurally similar to the ones for the port side boom beam element 6A, including the attachment points 13A and starboard side attachment points 13B. The hinged connection 20 of the port side boom beam element 6A interconnects the port side boom beam element 6A to the starboard side boom beam element 6B at their rear ends next to the fin 3A. The tail boom beam elements 6A, 6B are tapered along their length 22, with the larger height at the tail boom beam roots 7A, 7B.

Figure 5:
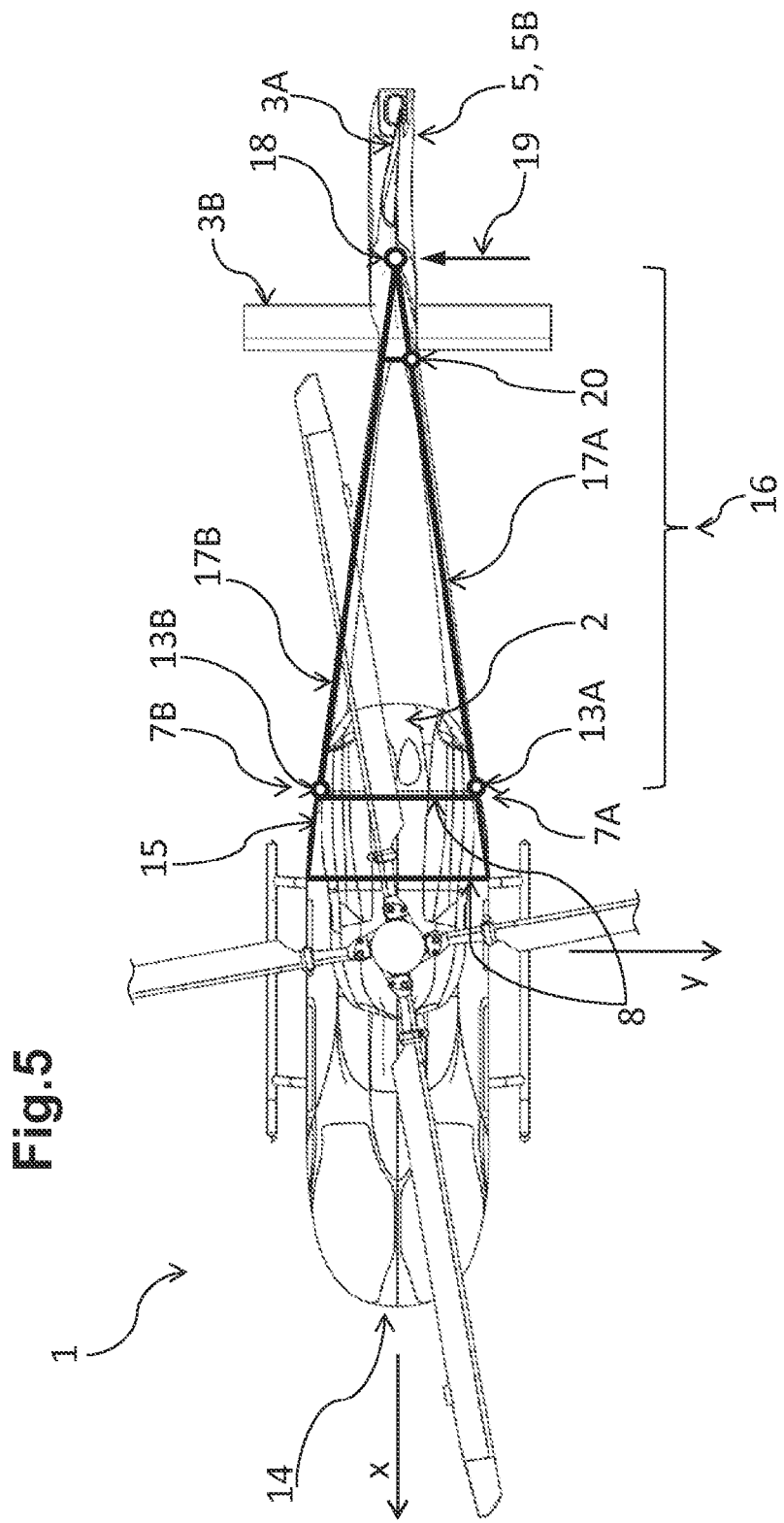
FIG. 5 shows a top view of the rotary wing aircraft according to the invention with a schematic arrangement of the structural supporting elements.

According to FIG. 5 a frame-work type construction 16 composed of two truss elements 17A and 17B corresponds to the tail boom beam elements 6A and 6B in the x-y plane. The truss elements represent the neutral lines of both tail boom beam elements. The truss elements 17A and 17B are supported at the fuselage 2 at the attachment points 13A and 13B. The port side boom beam element 6A is interconnected to the starboard boom beam element 6B at the hinged connection 20. The lines of action of the truss elements 17A, 17B are canted in the x-y plane to intersect each other at an intersection point 18. On FIG. 5 the transverse anti-torque force 19 provided by the tail 5 is in line with said intersection point 18.

Figure 6:
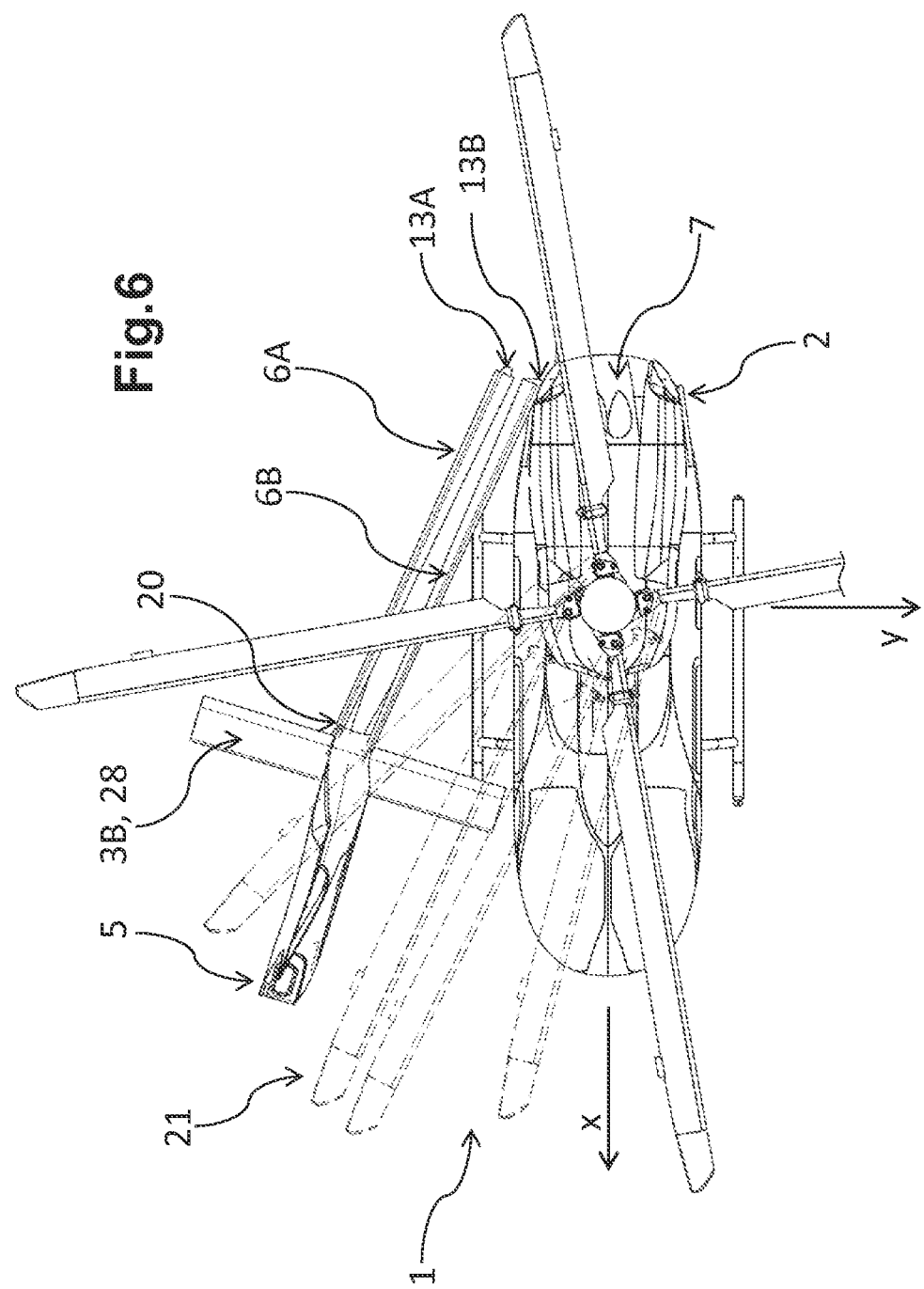
FIG. 6 shows a top view of the rotary wing aircraft according to the invention with a folded tail boom configuration.

According to FIG. 6 the rotary wing aircraft 1 is in its folded configuration ready for stowage, the elements 6A, 6B being pivoted against the fuselage 2 at the point 13B. Rotor blades 21 (dashed lines) of the main rotor 2A are folded in x-direction forwardly about their root hinges to a stowed position in a front part of the fuselage 2. After releasing the attachment point 13A the tail boom beam elements 6A, 6B are folded forwardly about the z-direction through the hinged attachment point 13B to a position alongside the starboard side of the rotary wing aircraft 1.

The tail boom beam element 6A is folded about the hinged connection 20, against the other element 6B. A T-tail (not shown) with an upper tail plane 28, e.g. horizontal, installed atop the fin 3A and above the rotor would allow the tail beam boom elements 6A, 6B to further rotate about the attachment point 13B to be aligned to the rotary wing aircraft's 1 x-direction and would hence reduce the compact stowage volume of the rotary wing aircraft 1 to a minimum.

As from FIG. 6, the inventive tail 3C is laterally rotatable, so as to be folded sideward against the fuselage, by at least one upwards hinged attachment connection between the respective front end of one of the beam boom elements 6A or 6B and the fuselage 2.

Besides, the two beam boom elements 6A, 6B are pivoted around a rear end upward hinge connection, for compacting the volume of the tail 3C from the operational "V" shaped position as seen on FIG. 5, to the compact position of the beam boom element 6A, 6B as seen on FIG. 6, where the beam boom element 6A, 6B are slightly parallel one to the other.

According to FIG. 7 an exemplary cross-section 26 in a y-z plane of the tail boom beam elements 6A, 6B is located among the inventive tail 3C, close to the fuselage 2 and the points 13A-B. The cross-section 26 has a width 24, i.e. an extension in y-direction, generally considerably less than its height 23, extension in z-direction, namely a height-to-width ratio of at least three (3). Other way speaking, the upwards dimension is here at minimum three times larger than the corresponding transverse dimension in a given cross-section of the beam boom element. The cross-section's airfoil shape and orientation are arranged in order to support the antitorque force 19 and to minimize the drag generated by the down wash air flow 25.

On FIG. 7 is shown an air gap G that is transversally provided between the two tail boom beam elements 6A, 6B. This air gap G has a transverse dimension GY. The maximal dimension GY transversally between both boom elements 6A-6B at their roots close to the fuselage 2 is e.g. in the range of one to five times the height of the upwards cross section of the boom elements 6A-6B at their root. The maximal transverse dimension GY is measured at the very rear end of the tail 3C, while there is actually a rearmost gap close to the fin 3A which is almost zero.

Should the rotor 5 being provided with an electrically powered rotor drive D, there is no mechanical force power transmission between the fuselage 2 and the tail rotor 5B.

REFERENCE LIST

1. Rotary wing aircraft
2. Fuselage 2A. Main Rotor
3. Tail boom—3A. Fin—3B. Plane 3C. Multi Beam Tail.
4. Tail boom root joint
5. Tail Rotor 5B: Electric Tail rotor.
6. Tail boom
   6A: port side beam boom element
   6B: starboard side beam boom element
7A. Tail boom beam element root
7B. Tail boom beam element root
8. Frame
9. Tail boom beam element box
10. Tail boom beam element upper part
11. Tail boom beam element lower part
12. Tail boom spar
13A. Spar attachment points
13B. Spar attachment points
14. Front part
15. Intercostal
16. Framework
17A. First truss element
17B. Second truss element
18. Beam intersection point (of lines of action)
19. Antitorque force
20. Rear hinged connection
21. Rotor blades
22. Tail boom length
23. Tail boom beam element height
24. Tail boom beam element width
25. Downwash
26. Tail boom element cross section
27. z-axis (Upright dimension Z)
28. Upper tail plane
29. Lateral side of fuselage
30. Engine
31. Boom width
32. Boom height
33. Fuselage width
34. Rear access door
X Longitudinal Direction
Y Transverse Direction
D Electrically Powered Rotor drive
G Air Gap
GY Air gap transverse dimension

What is claimed is:
1. A rotary wing aircraft with a longitudinal axis in x-direction comprising at least:

a fuselage forwardly oriented relative to the longitudinal axis with a port side and a starboard side as lateral sides,
a main rotor arranged above the fuselage,
a tail rotor mounted on a tail, the tail being attached to a rearward oriented part of the fuselage, the tail having a rear end supporting the tail rotor, and
at least one engine for driving at least one of the rotors, the engine being mounted on the fuselage; wherein:
   the tail is provided with two beam boom elements extending to the rear end of the fuselage, one of the two beam boom elements extending to the port side and the other beam boom element extending to the starboard side, a front root end of each of the two beam boom elements being respectively attached to the corresponding port or starboard side of the fuselage by a front attachment, the beam boom elements being canted with respect to the longitudinal axis and interconnected to each other at the rear end of the tail; and
   at least one of the front attachments is releasable and at least the other of the front attachments is pivotable, so that the tail is pivotable about a z-direction, around at least one of the front attachment.

2. The rotary wing aircraft according to claim 1, wherein the front attachments are simply supported hinged connections.

3. The rotary wing aircraft according to claim 1, wherein the cross-section of each of the two beam boom elements has a height-to-width ratio of at least three.

4. The rotary wing aircraft according to claim 2, wherein the front attachments have securing bolts; a number of securing bolts of each of the two beam boom elements being chosen among: two, three or four securing bolts.

5. The rotary wing aircraft according to claim 1, wherein the two front attachments are releasable.

6. The rotary wing aircraft according to claim 1, wherein each of the two beam boom elements is interconnected to the other at its rear end by means of a supported hinged connection.

7. The rotary wing aircraft according to claim 6, wherein each hinged connection has securing bolts; a number of securing bolts being chosen among: two, three or four securing bolts.

8. The rotary wing aircraft according to claim 6, wherein one of the beam boom elements is pivotable with respect to another at the rear ends of the two beam boom elements about the hinged connection.

9. The rotary wing aircraft of claim 6, wherein the beam boom elements each have a neutral line that is straight between the tail boom beam element front root and the rear hinged connection.

10. The rotary wing aircraft of claim 1, wherein an air gap is transversally provided between the two tail boom beam elements; the air gap having a transverse dimension that is comprised between an upright height dimension in cross section of the tail boom beam elements and five times this upright height dimension.

11. The rotary wing aircraft of claim 1, wherein at least one beam boom element is completely straight lined from the front attachment to the rear end.

12. The rotary wing aircraft of claim 1, wherein the cross-section of each of the beam boom elements has an airfoil shape so as to produce an anti-torque lifting force as a result from the down-wash flow from the main rotor.

13. The rotary wing aircraft of claim 1, the fuselage having a hull, wherein the beam boom elements have outer lateral shapes that are an aerodynamic continuation of the hull of the fuselage.

14. The rotary wing aircraft of claim 1, wherein the rotary wing aircraft comprises at least an electrically powered rotor drive for an electrically powered tail rotor.

* * * * *